United States Patent
Karl et al.

(10) Patent No.: US 8,845,347 B2
(45) Date of Patent: Sep. 30, 2014

(54) SYSTEM FOR RECEIVING A HEAD UNIT IN A VEHICLE

(75) Inventors: Alois Karl, Egling-Egertshausen (DE); Werner Pollak, Pforzheim (DE); Dieter Acker, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 40 days.

(21) Appl. No.: 13/586,579

(22) Filed: Aug. 15, 2012

(65) Prior Publication Data

US 2013/0043774 A1 Feb. 21, 2013

(30) Foreign Application Priority Data

Aug. 17, 2011 (EP) .................................... 11006732

(51) Int. Cl.
*H01R 13/62* (2006.01)
(52) U.S. Cl.
USPC .......................................... 439/157; 439/372
(58) Field of Classification Search
USPC .......................................... 439/157, 372, 378
See application file for complete search history.

(56) References Cited

U.S. PATENT DOCUMENTS

| | | | |
|---|---|---|---|
| 4,843,477 A | 6/1989 | Mizutani et al. | |
| 5,385,870 A * | 1/1995 | Maue et al. | 439/157 |
| 5,518,412 A | 5/1996 | Larabell | |
| 5,721,669 A | 2/1998 | Becker et al. | |
| 5,924,880 A * | 7/1999 | Watanabe et al. | 439/157 |
| 5,993,226 A * | 11/1999 | Yamaguchi | 439/157 |
| 6,848,925 B2 * | 2/2005 | Nishide | 439/247 |
| 7,066,763 B1 * | 6/2006 | Corwin et al. | 439/372 |
| 7,335,038 B2 * | 2/2008 | Duval | 439/157 |
| 7,727,001 B2 * | 6/2010 | Percherke et al. | 439/378 |
| 7,963,781 B2 * | 6/2011 | Takahashi et al. | 439/157 |

FOREIGN PATENT DOCUMENTS

EP 1 275 993 A1 1/2003

OTHER PUBLICATIONS

European Search Report from corresponding European patent application No. 11 006 732.9, 2pp., Jan. 25, 2012.

* cited by examiner

*Primary Examiner* — Gary Paumen
(74) *Attorney, Agent, or Firm* — Brooks Kushman P.C.

(57) ABSTRACT

A system including a mounting frame assembly for a head unit for a vehicle. The mounting frame assembly and the head unit may be attached to a vehicle. The mounting frame assembly may include a region operable to house a connector assembly. The connector assembly may include a connector operable to connect to a respective connector of the head unit. With respect to the connectors of the mounting frame assembly and the head unit, either may include an electrical and/or fiber optic connector.

17 Claims, 5 Drawing Sheets

SYSTEM FOR RECEIVING A HEAD UNIT IN A VEHICLE

PRIORITY CLAIM

This application claims the benefit of priority from European Patent Application No. 11 006 732.9, filed Aug. 17, 2011, which is incorporated by reference.

BACKGROUND OF THE INVENTION

1. Technical Field

The invention relates to an apparatus for receiving a head unit in a vehicle.

2. Related Art

Head units that are mounted in a vehicle may include a radio, a navigation system, and other multimedia components, for example. While mounting a head unit into a dashboard of a vehicle, for example, various cables or lines should be connected to the head unit (where such cables or lines may lead to speakers, antennas, or displays, for example). Some of these cables or lines may include connector assemblies having one or more connectors. For example, a connector assembly used in automobiles may include forty individual connectors.

SUMMARY

A system including a mounting frame assembly and a head unit. For example, the system may include a mounting frame assembly and a head unit that attaches to a vehicle. The mounting frame assembly may include a region operable to house a first connector assembly. The first connector assembly may include a first connector operable to connect to a respective second connector of the head unit. With respect to the first connector and respective second connector, either may include an electrical and/or fiber optic connector.

The mounting frame assembly may also include a first attaching part operable to interact with a respective second attaching part of the head unit. The purpose of this interaction between the first attaching part and the respective second attaching part may be to attach the head unit into the mounting frame assembly and to complete a connection between the first connector and the respective second connector.

The first attaching part may include a first movable part to interact with a second part of the respective second attaching part of the head unit. This interaction between the first movable part and the second part may provide an operative force, such as a pressing force, against the first connector from the head unit, as a result of the first movable part moving.

Additionally, the mounting frame assembly may be operable to slidably receive the head unit at an intermediate position. In such a case, the mounting frame assembly may attach the head unit to a position (such as the intermediate position) while moving the first attaching part in a first direction that facilitates a connection between the first connector of the mounting frame assembly and the respective second connector of the head unit. Also, the mounting frame assembly may be operable to attach the head unit to the intermediate position while moving the first attaching part in a second direction opposite to the first direction, which may facilitate disconnecting the first connector of the mounting frame assembly from the respective second connector of the head unit.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
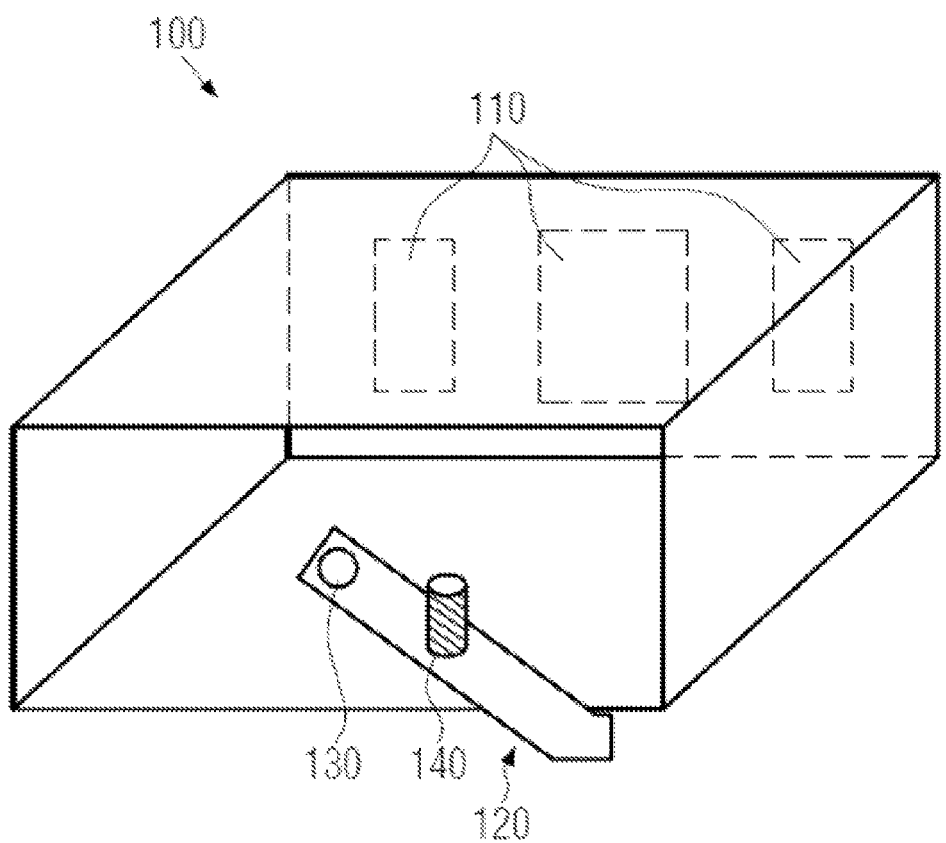
FIG. 1 illustrates an example of a mounting frame assembly.

It is to be understood that the following description of examples of implementations are given only for the purpose of illustration and are not to be taken in a limiting sense.

Described herein is a system that may include a mounting frame assembly and a head unit for a vehicle. Both the mounting frame assembly and the head unit may be attached to a vehicle. The mounting frame assembly may include a region operable to house one or more connector assemblies. The one or more connector assemblies may include one or more connectors operable to connect to one or more respective connectors of the head unit. With respect to the one or more connectors of the mounting frame assembly and the respective one or more connectors of the head unit, either may include one or more electrical and/or fiber optic connectors.

The mounting frame assembly may also include one or more attaching parts operable to interact with one or more respective attaching parts of the head unit. This interaction between the one or more attaching parts of the mounting frame assembly and the one or more respective attaching parts of the head unit may facilitate attaching the head unit into the mounting frame assembly. This interaction also may create a connection between the one or more connectors of the mounting frame assembly and the one or more respective connectors of the head unit. Also, the head unit can be attached (such as by insertion) to the mounting frame assembly, so that the head unit is pushed into, or engaged with, the mounting frame assembly and connectors of the head unit that are pushed into, or disposed adjacent to, the mounting frame assembly are pushed into, or engage with, corresponding connectors at a rear end of the head unit.

The one or more attaching parts of the mounting frame assembly may include one or more movable parts operable (such as manually or automatically) to interact with one or more receiving parts of the one or more respective attaching parts of the head unit, and/or vice versa. This interaction between the one or more movable parts and the one or more receiving parts may provide a force, such as a pressing force, or an insertion force against the one or more connectors of the mounting frame assembly, from the head unit. For example, this force occurs during movement of the one or more movable parts. Also, a movable part of the head unit may be operable to rotate around a joint of the mounting frame assembly, or vice versa. Further, the one or more movable parts of the mounting frame assembly may include one or more protrusions operable to be slidably engage with, or be received in one or more guide regions of the head unit, or vice versa. A guide region may include a guide rail and/or a guide channel.

Additionally, the one or more protrusions may exert a force on the one or more guide regions of the head unit and press the head unit against the one or more connectors of the mounting frame assembly, or vice versa. For example, a guide rail may be operable such that it is curved but not centered on a joint. Also, in other examples, a straight guide rail may be provided.

In one example, an attaching part may be manually operable. For example, an attaching part may be operated by a lever. For example, during mounting of the head unit, force can be provided by operating a lever manually.

Additionally, the mounting frame assembly may be operable to slidably receive the head unit to an intermediate position. In such a case, the mounting frame assembly may steady the head unit in a position (such as the intermediate position) while moving the one or more attaching parts in a first direction that facilitates a connection between the one or more connectors of the mounting frame assembly and the one or more respective connectors of the head unit. Also, the mounting frame assembly may be operable to steady the head unit to the intermediate position while moving the one or more attaching parts in a second direction opposite to the first direction, which may facilitate disconnecting the one or more connectors of the mounting frame assembly from the one or more respective second connectors of the head unit.

For example, in a mounting process of the head unit, the head unit may be inserted into the mounting frame assembly until an intermediate position is obtained (such as where connectors of both the mounting frame assembly and the head unit begin to contact each other). Next, the head unit may be moved from the intermediate position to a final position, such as an inserted or secured position, when the one or more attaching parts is operated in the first direction (such as by manually moving a lever from a first position to a second position. Also, for example, by manually moving a lever from the second position to the first position, the head unit can be detached or ejected from the mounting frame assembly.

Further, the mounting frame assembly may be operable to house the one or more connector assemblies so that the one or more connector assemblies is movable in one or more directions transverse to an insertion direction of the head unit into the mounting frame assembly. For example, the one or more connectors of the mounting frame assembly may not be firmly housed in the mounting frame assembly, but may slightly move around. In this example, connectors of the mounting frame assembly and the head unit may attach with each other, despite there not being a rigid coupling between the mounting frame assembly and the head unit.

In one example, the mounting frame assembly may include one or more adjustment pins for adjusting or aligning the one or more connector assemblies. The one or more adjustment pins may be operable to insert into one or more respective openings of the one or more connector assemblies during insertion of the head unit into the mounting frame assembly.

Figure 2:
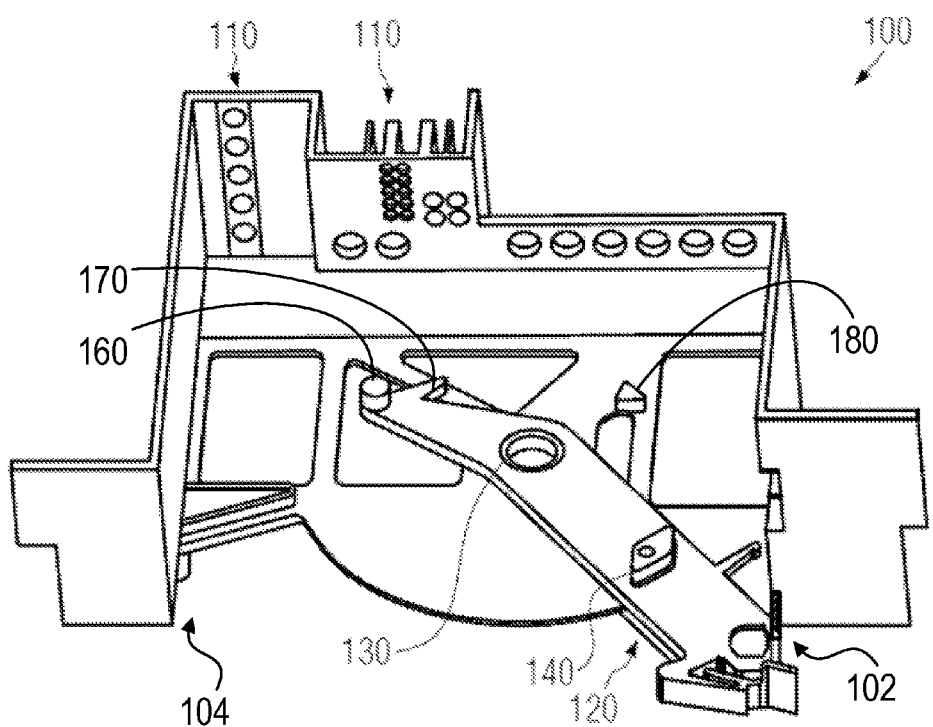
FIG. 2 is an example perspective view of a portion of the mounting frame assembly of FIG. 1.
Figure 3:
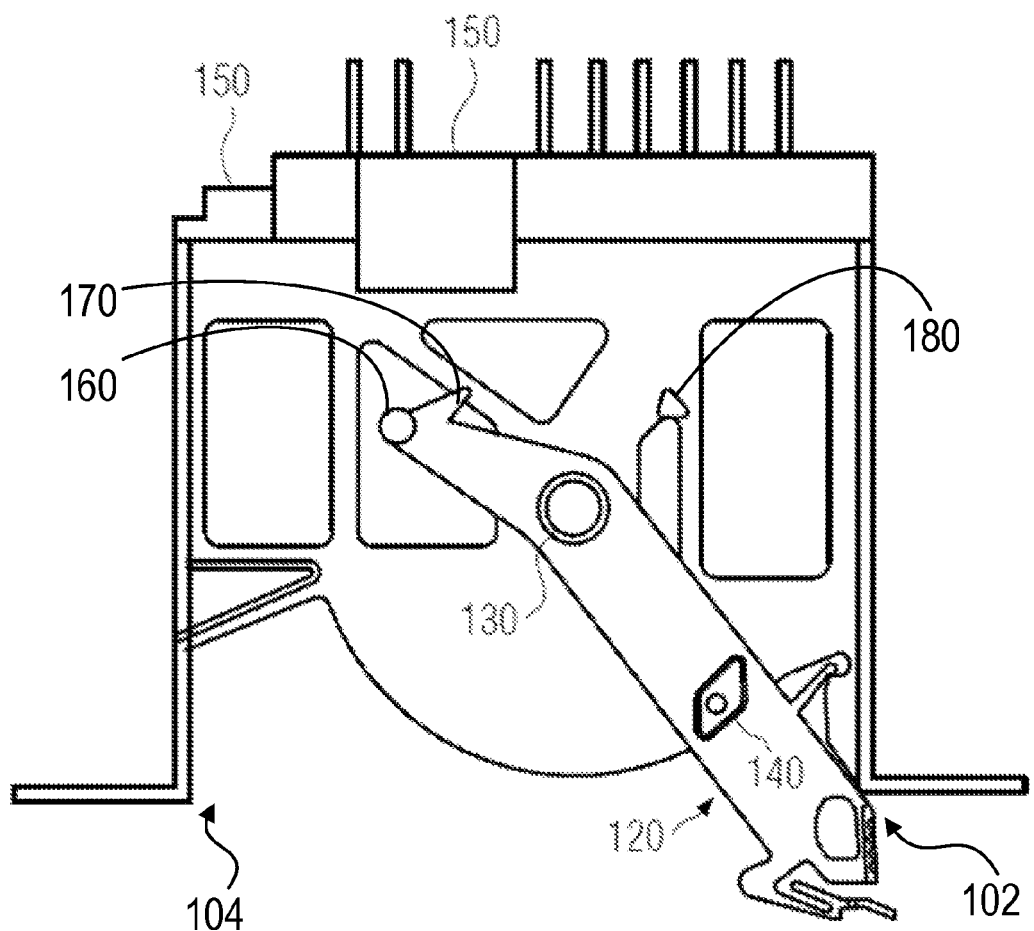
FIG. 3 is an example top view of the portion of the mounting frame illustrated in FIG. 2.
Figure 4:
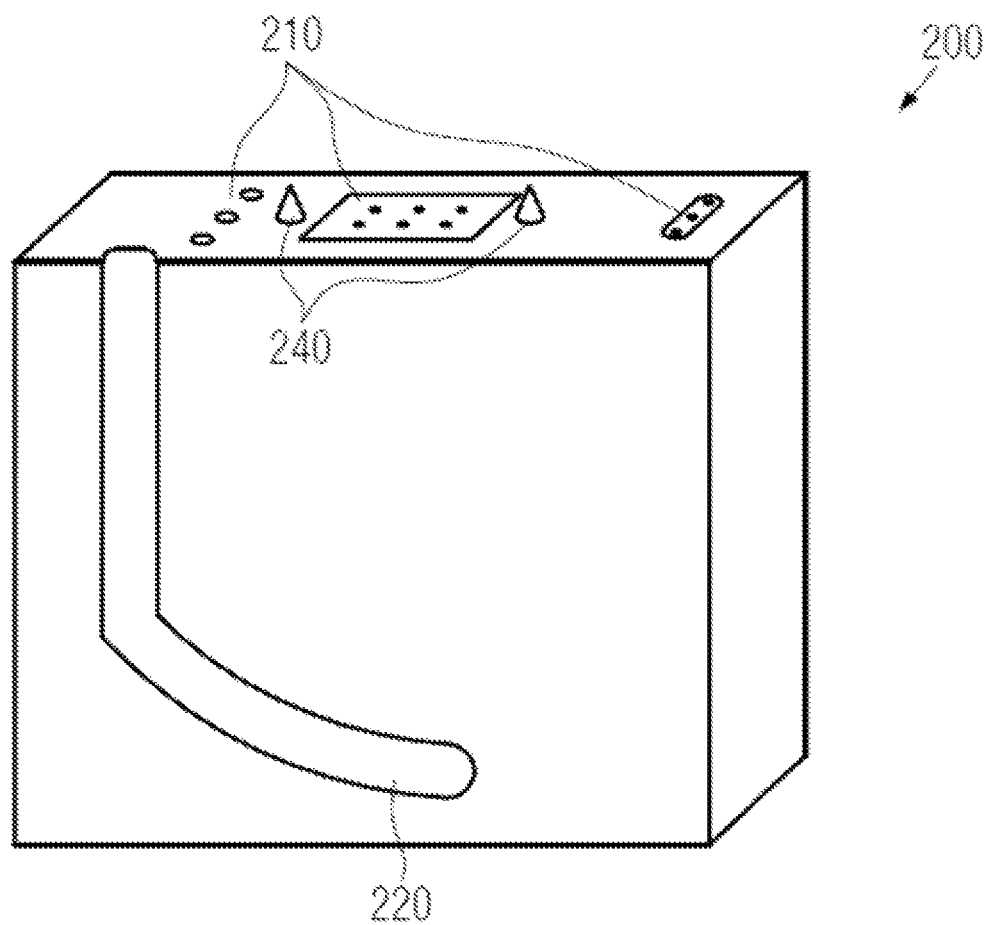
FIG. 4 illustrates an example head unit.
Figure 5:
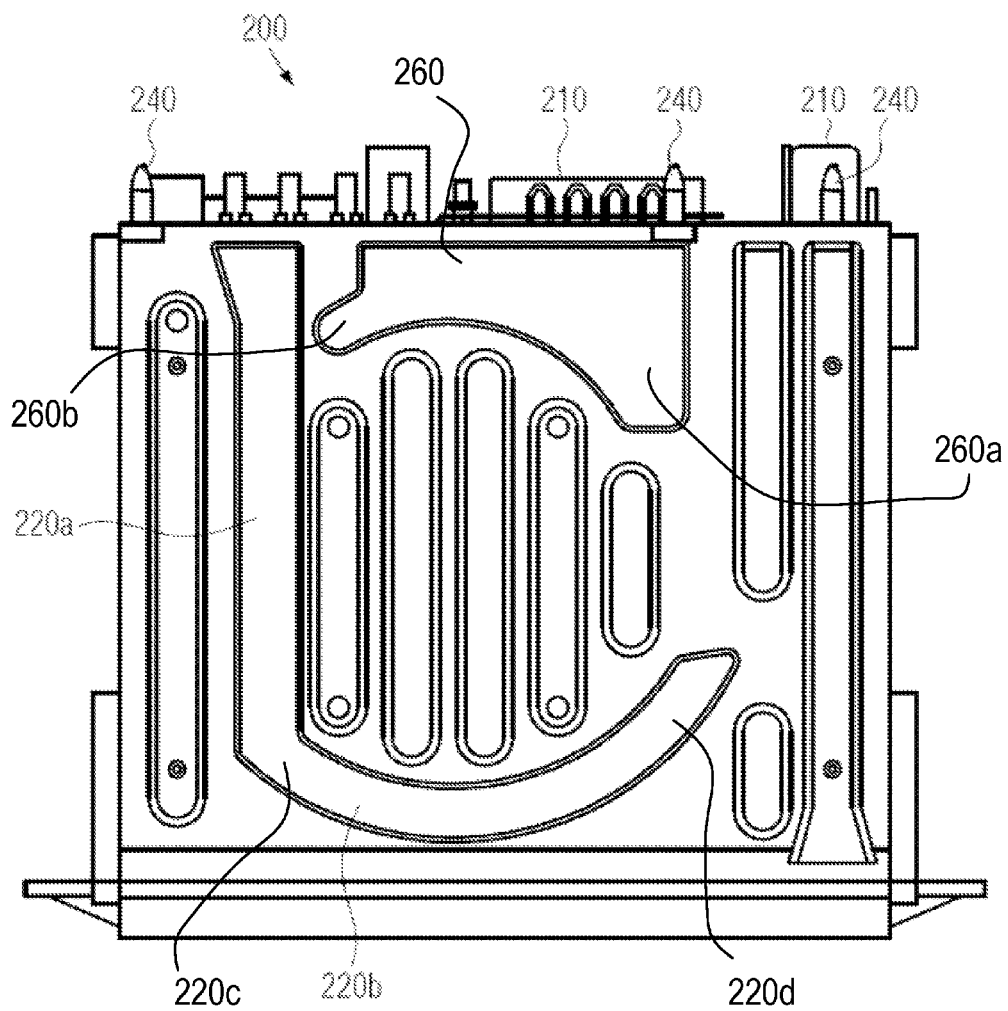
FIG. 5 is another example of a head unit.

FIGS. 1, 2, 3 illustrate an example mounting frame assembly; and FIGS. 4 and 5 illustrate an example head unit.

Regarding FIGS. 1-5, a mounting frame assembly 100 (see FIGS. 1 and 2) may reside, for example, into a dashboard of a vehicle. The mounting frame assembly 100 may be installed in a production line, for example. The mounting frame assembly 100 may include regions 110 (see FIGS. 1 and 2), which may be configured to house connector assemblies 150 (see FIG. 3). The connector assemblies 150 may include any form of signal connection mechanism, such as one or more electrical and/or fiber optic connectors. The one or more electrical and/or fiber optic connectors may be operable to connect to one or more respective electrical and/or fiber optic connectors (such as connectors 210) of a head unit 200 (see FIGS. 4 and 5). The mounting frame assembly 100 may also include a first attaching part 120 (see FIGS. 1-3) that is operable to interact with a first receiving part 220 (see FIG. 4) of the head unit 200. The first attaching part 120 may be operable to force, lever, or press the head unit 200 into the mounting frame assembly 100, which may result in a connection between the electrical and/or optical connectors of the mounting frame assembly 100 and the head unit 200.

Also, the first attaching part 120 may include a first moveable structure 140 (see FIGS. 1-3) that is operable to interact with a structure of the head unit 200, such as the first receiving part 220. Further, the first attaching part 120 may include a second moveable structure 160 (See FIGS. 2 and 3) that is operable to interact with a second receiving part 260 (See FIG. 5). One or more of these interactions may provide a force, such as a pressing force, insertion force, or operational force from the head unit 200 towards the electrical and/or fiber optic connectors of the mounting frame assembly 100. For example, in FIGS. 1-3 the first attaching part 120 may include a manually operable lever that is rotatable around a joint 130 of the mounting frame assembly 100. Also as shown, the first attaching part 120 may include the first movable structure 140, which may be a protrusion that is operable to be slidably received in a guide region, such as the first receiving part 220 of the head unit 200. Also as shown, the first attaching part 120 may include the second movable structure 160, which may be a protrusion that is operable to be slidably received in a guide region, such as the second receiving part 260.

Moreover, as taught by the FIGS. 1-5, when the head unit 200 is inserted into the mounting frame assembly 100, the head unit may slide to an intermediate position of or into the mounting frame assembly, and the first movable structure 140 slides along a straight part 220a (see FIG. 5) of the first receiving part 220.

Further, the head unit may be moved into a final position, such as an inserted or secured position, in operating the first attaching part 120 from a right side 102 to a left side 104 (see FIGS. 2 and 3) of the mounting frame assembly 100, for example. During the operation of the first attaching part 120 from the right side 102 to the left side 104, the first movable structure 140 may slide along a curved part 220b (see FIG. 5) of the first receiving part 220, from a left side 220c to a right side 220d of the first receiving part, which forces the head unit 200 into the final position, such as an inserted or secured position; thereby, connecting the electrical and/or fiber optic connectors of the mounting frame assembly 100 and the head unit. Also, during this operation, the second movable structure 160 may slide along a curved part of the second receiving part 260, from a right side 260a to a left side 260b of the second receiving part, which facilitates forcing the head unit 200 into the final position. Further, a first securing structure 170 of the mounting frame assembly 100 may interact with a second securing structure 180 of the mounting frame assembly, such as after the second movable structure 160 slides along the curved part of the second receiving part 260 (from the right side 260a to the left side 260b), which further secures the head unit 200 into the final position. Sufficient force to turn or slide a lever, such as the first attaching part 120, is lesser than force sufficient to directly press together the electrical and/or fiber optic connectors of the mounting frame assembly 100 and the head unit 20.

To remove the head unit 200 from the mounting frame assembly 100, the first attaching part 120 may be rotated about the joint 130 of the mounting frame assembly. The first attaching part 120 may rotate in an opposite direction a first amount, from the left side 104 to the right side 102 of the mounting frame assembly; thereby, pressing or ejecting the head unit 200 outwards from the final position in the mounting frame assembly 100 to the intermediate position, and disconnecting the electrical and/or fiber optic connectors of the mounting frame assembly and the head unit 200.

The head unit 200 may further include one or more adjustment or alignment pins, such as pins 240 (see FIGS. 4 and 5) for adjusting position of a connector assembly, such as the connector assemblies 150. For example, when the head unit 200 is inserted into the mounting frame assembly 100, the pins 240 may be inserted into a corresponding opening of the connector assemblies 150, thereby centering or aligning the connector assemblies. This allows the electrical and/or fiber optic connectors of the mounting frame assembly 100 and the head unit 200 to connect with each other. For example, the pins 240 may facilitate the joining of the electrical and/or fiber optic connectors of the mounting frame assembly 100 and the head unit 200, while pressing the head unit into the mounting frame assembly during the rotation of the attaching part 120.

While various embodiments of the invention have been described, it may be apparent to those of ordinary skill in the art that many more embodiments and implementations are possible within the scope of the invention. Accordingly, the invention is not to be restricted except in light of the attached claims and their equivalents.

We claim:

1. An apparatus for receiving a head unit, comprising:
a region operable to house a first connector assembly, including a first connector operable to connect to a respective second connector of a head unit that enables one of navigation operations and multimedia operations; and
a first attaching part operable to interact with a respective second attaching part of the head unit to attach the head unit into the apparatus and to secure a connection between the first connector and the respective second connector, where the first attaching part comprises a first movable part operable to interact with a second part of the respective second attaching part of the head unit to provide an operative force against the first connector from the head unit, as a result of the first movable part moving,
wherein the first attaching part includes a first protrusion and a second protrusion, each of the first protrusion and the second protrusion being positioned opposite to one another on a first side of the first attaching part and wherein the first protrusion is operable to rotate around a joint to be slideably received in a first guide region of the head unit and the second protrusion is operable to rotate around the joint to be slideably received in a second guide region of the head unit.

2. The apparatus according to claim 1, operable to attach to a vehicle.

3. The apparatus according to claim 1, where the first connector comprises an electrical connector.

4. The apparatus according to claim 1, where the first connector comprises a fiber optic connector.

5. The apparatus according to claim 1, where the first guide region comprises a guide rail or a guide channel.

6. The apparatus according to claim 1, where the first attaching part is manually operable.

7. The apparatus according to claim 1, operable to:
slidably receive the head unit at an intermediate position; and
steady the head unit at the intermediate position, the first attaching part movable in a first direction to facilitate a connection between the first connector and the respective second connector.

8. The apparatus according to claim 7, operable to: steady the head unit at the intermediate position, the first attaching part movable in a second direction opposite to the first direction, which facilitates disconnecting the first connector from the respective second connector.

9. The apparatus according to claim 1, operable to:
house the first connector movably in a direction transverse to an insertion direction of the head unit into the apparatus.

10. The apparatus according to claim 1, comprising adjustment pins configured to align the first connector assembly, where the adjustment pins are operable to insert into respective openings of the first connector assembly during insertion of the head unit into the apparatus.

11. A head unit for insertion into a mounting frame assembly, comprising:
a first connector operable to connect to a respective second connector of the mounting frame assembly, where the mounting frame assembly comprises a region operable to house a connector assembly that includes the respective second connector; and
a first attaching part operable to interact with a respective second attaching part of the mounting frame assembly, to receive a head unit into the mounting frame assembly and to secure a connection between the first connector and the respective second connector, where the head unit enables one of navigation operations and multimedia operations and the first attaching part comprises a first part operable to interact with a second movable part of the second attaching part of the mounting frame assembly to facilitate an operative force against the respective second connector from the head unit, as a result of the second movable part moving,
wherein the first attaching part includes a first protrusion and a second protrusion, each of the first protrusion and the second protrusion being positioned opposite to one another on a first side of the first attaching part and wherein the first protrusion is operable to rotate around a joint to be slideably received in a first guide region of the head unit and the second protrusion is operable to rotate around the joint to be slideably received in a second guide region of the head unit.

12. The head unit according to claim 11, where the first connector comprises an electrical connector.

13. The head unit according to claim 11, where the first connector comprises a fiber optic connector.

14. The head unit according to claim 11, where the first guide region comprises a guide rail.

15. The head unit according to claim 11, where the first guide region comprises a guide channel.

16. A system, comprising:
a mounting frame assembly that includes a region operable to house a first connector assembly that includes a first connector operable to connect to a respective second connector of a head unit that enables one of navigation operations and multimedia operations; and
a first attaching part operable to interact with a respective second attaching part of the head unit, to attach the head unit to the mounting frame assembly and to form a connection between the first connector and the respective second connector, where the first attaching part comprises a first movable part operable to interact with a second part of the respective second attaching part of the head unit to provide an operative force against the first connector from the head unit, as a result of the first movable part moving, wherein the first attaching part includes a first protrusion and a second protrusion, each of the first protrusion and the second protrusion being positioned opposite to one another on a first side of the first attaching part and wherein the first protrusion is operable to rotate around a joint to be slideably received in a first guide region of the head unit and the second protrusion is operable to rotate around the joint to be slideably received in a second guide region of the head unit.

17. The system according to claim 16, comprising adjustment pins configured to align the first connector assembly, where the adjustment pins are operable to insert into respective openings of the first connector assembly during insertion of the head unit into the mounting frame assembly.

* * * * *